Patented Nov. 3, 1931

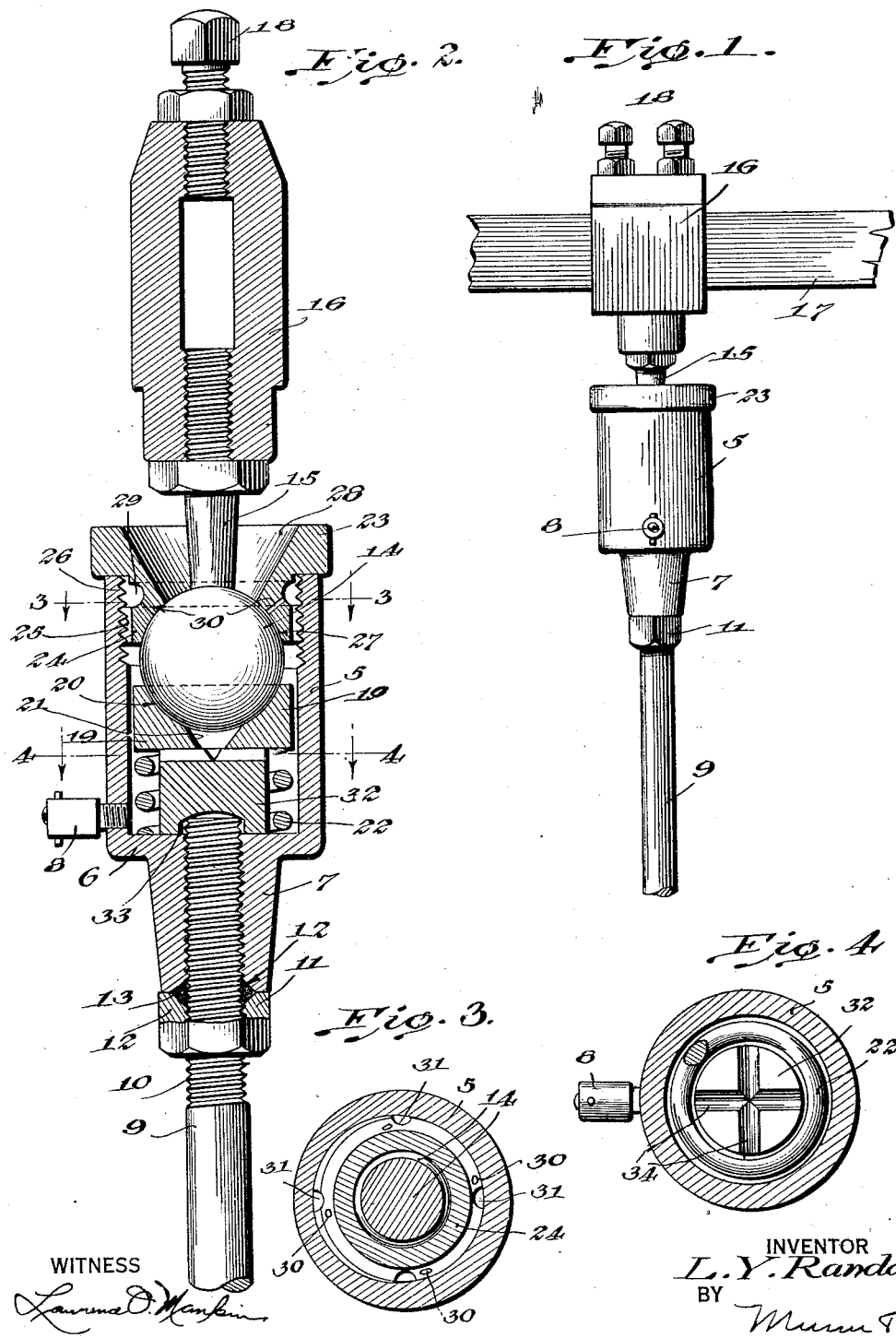

1,829,964

UNITED STATES PATENT OFFICE

LUCIUS Y. RANDALL, OF GAFFNEY, SOUTH CAROLINA

UNIVERSAL CONNECTION

Application filed May 28, 1930. Serial No. 456,766.

My invention relates to lubricating universal connections for connecting two operating parts of a machine such as the lift rod and over head horizontal lever of a loom.

An object of the present invention is to provide a self-lubricating universal connection which may be quickly adjusted to compensate for wear between the various parts.

More specifically the invention provides a device of this character embodying a cup which is adjustable on the lift rod and a follower which is adjusted incident to the adjustment of the cup so as to force the bearing members against the universal head to compensate for wear between these parts.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a side elevation of the invention;

Fig. 2 is a vertical sectional view of the same on an enlarged scale;

Fig. 3 is a horizontal section taken on line 3—3 of Fig. 2; and

Fig. 4 is a horizontal section taken on line 4—4 of Fig. 2.

Referring to the invention in detail a cylindrical cup 5 whose bottom 6 is formed with an internally threaded sleeve 7, is provided. The cup 5 is adapted to contain a suitable lubricant and to that end a conventional fitting 8 is mounted on one side of the cup for connecting the latter to a suitable grease gun.

A vertically extending lift rod 9 has its threaded upper end 10 threaded into the sleeve 7 so that the upper extremity of this rod projects into the cup.

The cup 5 is adapted to be adjusted on the threaded end 10 of the lift rod and in order to lock the cup in adjusted position a lock nut 11 is received on this threaded end below the lower end of the sleeve 7. To insure a liquid tight joint between the nut and lower end of the sleeve and inner face of the nut and the lower end of the sleeve is formed with opposed recesses 12 in which a suitable packing 13 is arranged.

Arranged in the cup 5 is a spherical head or universal ball 14 having an upstanding shank 15 which is threadedly connected with a yoke 16 through which the lever 17 of a loom, or other machine, passes. Suitable set screws 18 are carried by the upper end of the yoke and engage the lever 17 to hold the parts together.

Arranged in the cup 5 below the head 15 is a bearing member 19 having a concave upper face 20 which embraces the head 14. This bearing member 19 is further provided with a central tapered opening 21 through which some of the lubricant finds its way to the concave face 20 and head 14. In order to hold the bearing member 19 in contact with the head 14 an expansible coil spring 22 is interposed between the under face of the bearing member 19 and the bottom 6.

A closure 23 is provided for the upper end of the cup and is cast with an upper bearing member 24 which is formed with circumferential screw threads 25 having threaded engagement with interior screw threads 26 formed upon the walls of the cup 5 at its upper end. The under face of the upper bearing member is formed with a concavity 27 which embraces the universal head 14. A frusto-conical shaped opening 28 is formed within the closure 23 and opens into the concavity 27.

In order that the cup 5 may contain a maximum quantity of lubricant the upper bearing member is formed with a circumferential groove 29 into which some of the lubricant will be stored. For the purpose of conducting the lubricant from the groove 29 to the upper part of the universal head 13 a plurality of relatively small bores 30 are formed in the upper bearing member and communicate with the grooves 29 and concavity 27. The periphery of the bearing member 24 is formed with a plurality of vertically extending passageways so that a lubricant will pass into the groove 29 when the cup is filled.

For the purpose of moving the lower bearing member 19 against the universal head to compensate for wear a circular follower 32 is arranged upon the bottom of the cup and contacts with the under face of this bearing member. In order to cause the follower 32 to force the bearing member 19 against the head 14 the under face of the follower is formed with a central circular recess 33 into which the projecting end of the lift rod extends. In order to permit lubricant to pass between the contacting faces of the follower 32 and the bearing member 19 the upper face of the follower is formed with radially disposed communicating grooves 34. It will be seen that some of the lubricant will pass through these grooves and into the opening 21 where it contacts with the spherical head 14 and concavity 20.

In addition to the universal connection being self-lubricating, wear may be readily compensated for between the bearing members and head. In this connection it will be apparent that it is only necessary to first loosen the lock nut 11 and thread the cup 5 downwardly on the lift rod. As the cup is threaded downwardly the follower is forced against the lower bearing member and adjusts the same against the spherical head. By reason of the upper bearing member being carried by the cup 5 it is also drawn against the spherical head incident to the adjustment of the cup.

What is claimed is:

1. In a universal connection, a cup, means for mounting the same for longitudinal adjustment upon a rod, a universal head arranged in the cup and having means for attaching the latter to a machine part, bearing members within the cup upon opposite sides of the universal head, one of said bearing members having a hole therethrough, thru which the attaching means are adapted to pass, means operable to move one of the bearing members towards the universal head incident to longitudinal adjustment of the cup, and means for adjusting said universal head relative to said machine part whereby to compensate for the movement of said cup.

2. In a self-lubricating universal connection, a cup having an internally threaded sleeve at one end adapted for threaded engagement with one end of a rod, a universal head in the cup, a pair of bearing members arranged in the cup and contacting with the head from opposite sides thereof, one of said bearing members having a hole therethrough, a spring interposed between the bottom of the cup and the adjacent bearing member, a stem extending from said universal head thru the hole in one of said bearing members and a follower in the cup and adjusted vertically therein against the adjacent bearing member incident to adjustment of the sleeve on the rod.

3. In a universal connection, a cup having a threaded opening at one end, a rod threadedly engaged with the opening and having one end projecting into the cup, a universal head in the cup, a stem extending from the universal head, upper and lower bearing members in the cup and embracing the head, one of said bearing members having a hole therein thru which said stem projects, an expansible coil spring interposed between the bottom of the cup and the lower bearing member, and a follower in the cup and engaging the lower bearing member and with projecting end of the rod so that upon threading of the cup on the rod in one direction the lower bearing member will be adjusted towards the head.

4. In a universal connection, a cup having a threaded opening at one end, a rod threadedly engaged with the opening and having one end projecting into the cup, a universal head in the cup, a stem extending from the universal head, upper and lower bearing members in the cup and embracing the head, the upper bearing member having a hole therein thru which the stem is adapted to project, an expansible coil spring interposed between the bottom of the cup and the lower bearing member, and a follower in the cup and engaging the lower bearing member and said projecting end of the rod so that upon threading of the cup on the rod in one direction the lower bearing member will be adjusted towards the head, and means for locking the cup against rotation on the rod.

5. In a universal connection, a cup having a threaded opening at one end, a rod threadedly engaged with the opening and having one end projecting into the cup, a universal head in the cup, a stem extending from the universal head, upper and lower bearing members in the cup and embracing the head, an expansible coil spring interposed between the bottom of the cup and the lower bearing member, and a follower in the cup and engaging the lower bearing member and said projecting end of the rod so that upon threading of the cup on the rod in one direction the lower bearing member will be adjusted towards the head, a lock nut threaded on the rod below the cup for locking the latter in adjusted position, the cup and opposed faces of the lock nut having recesses therein, and a packing in the recesses, the upper bearing member having a hole therethrough for the reception of said stem.

6. In a self-lubricating universal connection, a cup, an internally threaded sleeve formed with the bottom thereon, a rod threaded into the sleeve and having one end protruding into the cup, a universal head in the cup, a stem for connecting the latter with a machine part, a closure for the cup, an upper bearing member carried thereby and embracing the head and having a hole receiving said stem, a lower bearing member in the cup and embracing the head, an expansible spring interposed between the bottom of the cup and the lower bearing member, and a follower engaged by the protruding end of the rod and contacting with the lower bearing member whereby to adjust the latter against the head as the cup is rotated in one direction on the rod.

7. In a self-lubricating universal connection, a cup, an internally threaded sleeve formed with the bottom thereof, a rod threaded into the sleeve and having one end protruding into the cup, a universal head in the cup, a stem integral with the head for connecting the latter with a machine part, a closure for the cup, said closure having a hole therein thru which the stem is passed, an upper bearing member carried thereby and embracing the head, a lower bearing member in the cup and embracing the head, an expansible spring interposed between the bottom of the cup and the lower bearing member, and a follower engaged by the protruding end of the rod and contacting with the lower bearing member whereby to adjust the latter against the head as the cup is rotated in one direction on the rod, and a lock nut on the rod below the sleeve for locking the cup against rotation.

8. In a lubricating universal connection, a lubricant containing cup to be rigidly mounted on a rigid element, a fitting carried by one side thereof for filling the cup with lubricant, a lower bearing member, a universal head engaged thereby, a closure for the cup, an upper bearing member formed with the under face of the closure and threaded into the cup, the upper bearing member having a circumferential groove for storing a quantity of lubricant, the side of the upper bearing member having vertically extending passageways to permit lubricant to pass into the groove, and the upper bearing member having radially disposed bores which communicate with the groove and open upon the inner face of the upper bearing member.

LUCIUS Y. RANDALL.